United States Patent [19]

Okudaira

[11] Patent Number: 4,556,295
[45] Date of Patent: Dec. 3, 1985

[54] ULTRACOMPACT TELEPHOTO LENS
[75] Inventor: Sadao Okudaira, Tokyo, Japan
[73] Assignee: Asahi Kogaku Kogyo Kabushiki Kaisha, Tokyo, Japan
[21] Appl. No.: 498,907
[22] Filed: May 27, 1983
[30] Foreign Application Priority Data
  May 31, 1982 [JP] Japan .................. 57-92771
[51] Int. Cl.$^4$ .............................................. G02B 13/02
[52] U.S. Cl. .................................................. 350/454
[58] Field of Search ................ 350/454, 455, 456, 457
[56] References Cited
  U.S. PATENT DOCUMENTS
  4,176,913 12/1979 Nakamura et al. .................. 350/455
  4,206,971 6/1980 Hamanishi et al. .................. 350/456

*Primary Examiner*—John K. Corbin
*Assistant Examiner*—P. M. Dzierzynski
*Attorney, Agent, or Firm*—Lyon & Lyon

[57] ABSTRACT

An ultracompact telephoto eight-group ten-element or eight-group eleven-element lens comprises, in order from an object, a front four-group four-element lens group including a first positive lens having a surface of a smaller radius of curvature directed toward the object, a second positive lens having a surface of a smaller radius of curvature directed toward the object, a third double-concave lens, and a fourth positive-meniscus lens having a surface of a smaller radius of curvature directed toward the object, an intermediate three-group five-element lens group including a compound lens composed of a fifth negative lens and a sixth double-convex lens, a compound lens composed of a seventh negative lens and an eighth double-convex lens, and a ninth negative lens having a surface of a smaller radius of curvature directed toward the object, and a rear lens group including a single tenth positive lens or a positive compound lens composed of a tenth positive lens and an eleventh negative lens.

2 Claims, 6 Drawing Figures

ULTRACOMPACT TELEPHOTO LENS

BACKGROUND OF THE INVENTION

The present invention relates to an ultracompact telephoto lens.

Telephoto lenses for use on 35 mm single-lens reflex cameras have become highly improved in performance in recent years. As low-dispersion glass now can be produced relatively stably, chromatic aberration, which conventional telephoto lenses have most suffered from, can be corrected relatively effectively. Many high-performance telephoto lenses using low-dispersion glass, particularly super telephoto lenses covering an image angle of 8° or smaller, are found on the market today.

SUMMARY OF THE INVENTION

It is an object of the present invention to provide an improved telephoto lens.

It is another object of the present invention to provide an ultracompact telephoto lens of high performance which incorporates lens elements of low-dispersion glass for use in telephotography in a regular telephoto range with an image angle of 12.5° and a telephotographic ratio of 0.6.

The above and other objects, features and advantages of the present invention will become more apparent from the following description when taken in conjunction with the accompanying drawings in which a preferred embodiment of the present invention is shown by way of illustrative examples.

DESCRIPTION OF THE PREFERRED EMBODIMENT

Figure 1:
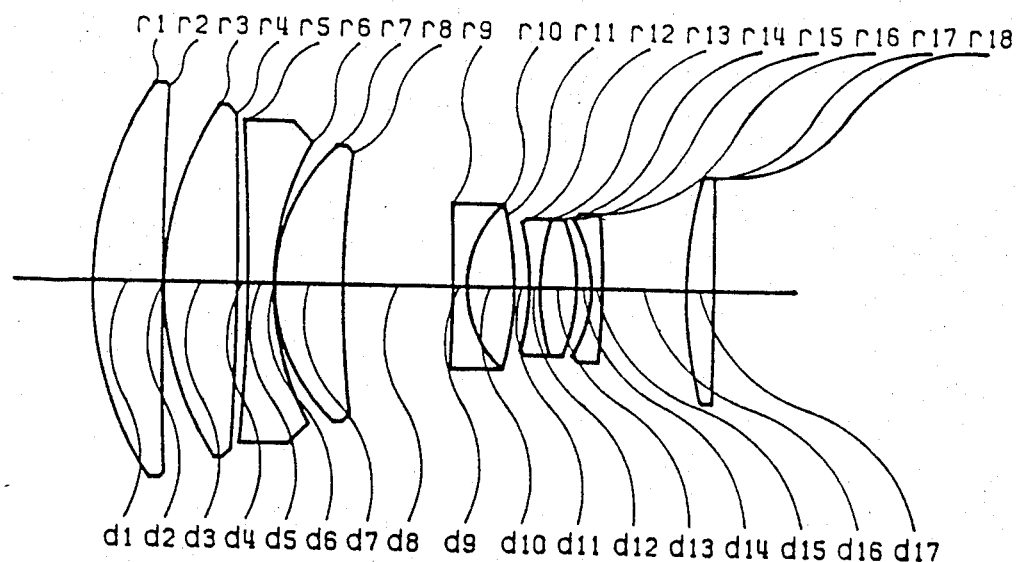
FIGS. 1, 3 and 5 are views showing arrangements of lenses according to Examples 1, 2 and 3, respectively, of the present invention.
Figure 2:
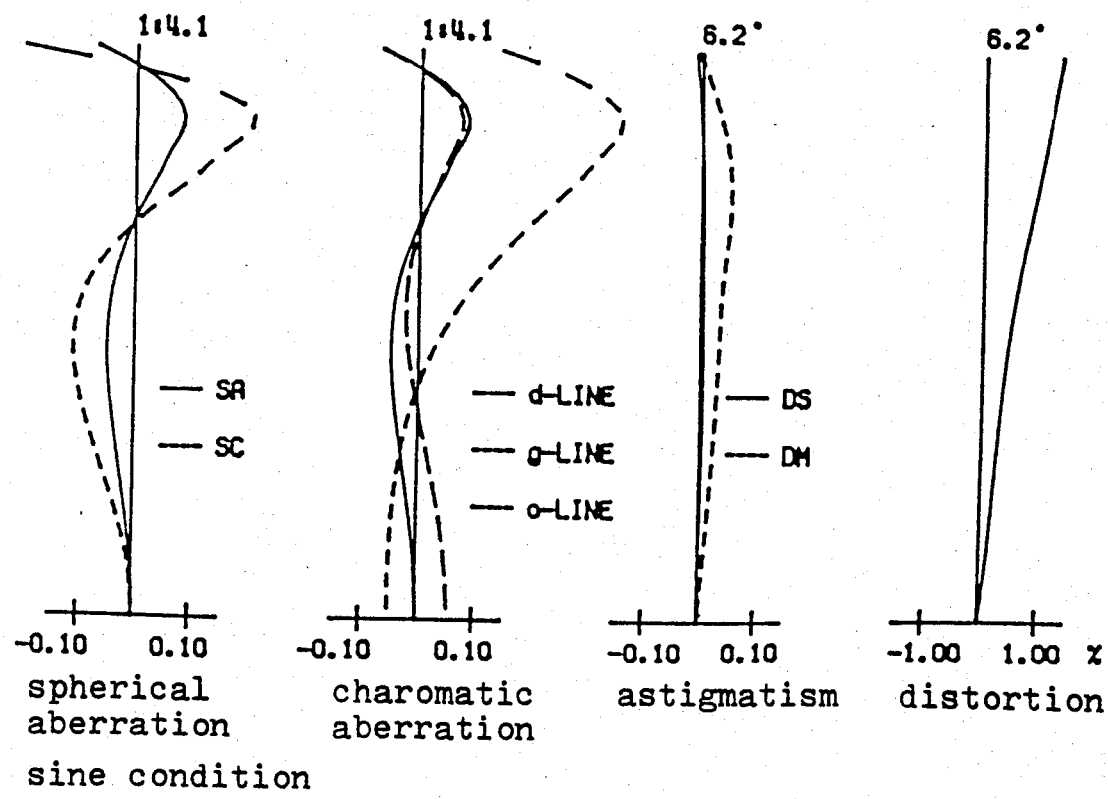
FIGS. 2, 4 and 6 are diagrams illustrating aberration curves for the lenses of Examples 1, 2 and 3, respectively.

An ultracompact telephoto eight-group ten-element or eight-group eleven-element lens according to the present invention comprises, in order from an object, a front four-group four-element lens group including a first positive lens having a surface of a smaller radius of curvature directed toward the object, a third double-concave lens, and a fourth positive-meniscus lens having a surface of a smaller radius of curvature directed toward the object, an intermediate three-group five-element lens group including a compound lens composed of a fifth negative lens and a sixth double-convex lens, a compound lens composed of a seventh negative lens and an eighth double-convex lens, and a ninth negative lens having a surface of a smaller radius of curvature directed toward the object, and a rear lens group including a single tenth positive lens or a positive compound lens composed of a tenth positive lens and an eleventh negative lens. The telephoto lens is arranged to meet the following conditions:

$$\frac{\nu_1 + \nu_2 + \nu_4}{3} > 75 \tag{1}$$

$$0.4 > F_{1,2,3,4}/F > 0.2 \tag{2}$$

$$\frac{(n_5 + n_7) - (n_6 + n_8)}{2} > 0.1 \tag{3}$$

$$0.07\,F > d_{16} > 0.03\,F \tag{4}$$

where
$\nu_i$ is the Abbe number of the ith lens,
$F_{1,2,3,4}$ is the combined focal length of the first to fourth lenses,
$F$ is the combined focal length of the overall lens system,
$n_i$ is the refractive index at d-line of the ith lens, and
$d_{16}$ is the distance between the ninth and tenth lenses.

The condition (1) serves to minimize chromatic aberration caused in the front lens group in an effort to render the optical system compact. More specifically, if $(\nu_1+\nu_2+\nu_4)/3$ were smaller than 75, then chromatic aberration on the axis and magnification of chromatic aberration off-axis in the front lens group would be increased, and high-performance of the overall optical system could not be achieved.

The condition (2) prescribes the focal length of the front lens group for a compact telephoto lens size according to the invention. If $F_{1,2,3,4}/F$ were greater than 0.4, then the compact size of a lens according to the invention would not be accomplished. If $F_{1,2,3,4}/F$ were smaller than 0.2, then the optical system could be rendered compact, but various aberrations, particularly chromatic aberration and spherical aberration, would be increased in the front lens group even with relatively stable glass materials available today.

The condition (3) serves to correct the Petzval sum that would be difficult to correct in telephoto lenses. If $[(n_5+n_7)-(n_6+n_8)]/2$ were smaller than 0.1, then the Petzval sum would become too small negatively, resulting in poor astigmatism.

The condition (4) prescribes the position of the positive lens (rear lens group) closest to an image formed. More specifically, if $d_{16}$ were smaller than 0.03F, then the height of a ray at the edge of the image field falling on the tenth lens would be lowered, making it difficult to correct distortion. If $d_{16}$ were greater than 0.07F, then the back focus necessary for a single-reflex camera lens could not be achieved while maintaining a telephotographic ratio of the present invention.

Examples of the present invention are described below. Throughout these examples, F denotes the focal length, $\omega$ the half angle of view, r the radius of curvature, d the lens thickness or lens thickness, n the refractive index at d-line, and $\nu$ the Abbe number.

| Example 1 (FIG. 1) | F = 195 | FNO 1:4.1 | $\omega$ = 6.2° |
|---|---|---|---|
| r | d | n | $\nu$ |
| 1   44.184 | | 1.61800 | 63.4 |
| | 8.578 | | |
| 2   639.967 | | | |
| | 0.200 | | |
| 3   39.074 | | 1.43387 | 95.2 |
| | 9.039 | | |
| 4   −476.693 | | | |
| | 1.313 | | |
| 5   −256.327 | | 1.83400 | 37.2 |
| | 3.190 | | |
| 6   35.458 | | | |
| | 0.150 | | |
| 7   23.142 | | 1.43387 | 95.2 |
| | 8.410 | | |
| 8   131.889 | | | |
| | 13.474 | | |

-continued

| Example 1 (FIG. 1) F = 195 FNO 1:4.1 ω = 6.2° | | | |
|---|---|---|---|
| 9 | −235.363 | 1.80400 | 46.6 |
| | 1.700 | | |
| 10 | 13.838 | 1.63980 | 34.5 |
| | 5.876 | | |
| 11 | −39.056 | | |
| | 1.876 | | |
| 12 | −30.538 | 1.80400 | 46.6 |
| | 1.380 | | |
| 13 | 26.996 | 1.59270 | 35.3 |
| | 4.514 | | |
| 14 | −21.918 | | |
| | 1.883 | | |
| 15 | −16.202 | 1.80400 | 46.6 |
| | 1.360 | | |
| 16 | −96.073 | | |
| | 10.558 | | |
| 17 | 52.324 | 1.48749 | 70.1 |
| | 3.433 | | |
| 18 | −1000.000 | | |

$$\frac{\nu_1 + \nu_2 + \nu_4}{3} = 84.6$$

$$F_{1,2,3,4}/F = 0.32$$

$$\frac{(n_5 + n_7) - (n_6 + n_8)}{2} = 0.19$$

$$d_{16} = 0.054F$$

Figure 3:
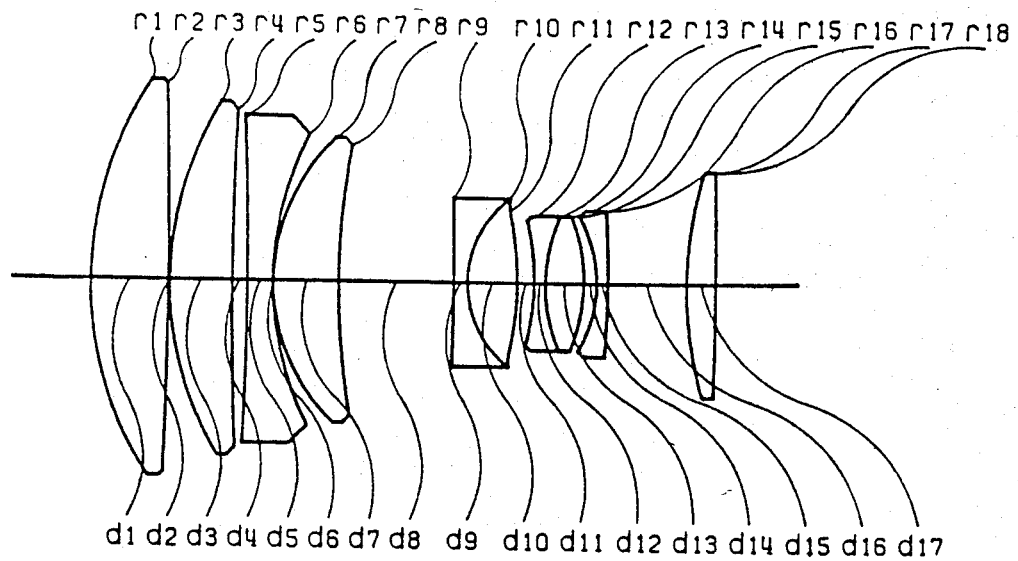
Figure 4:
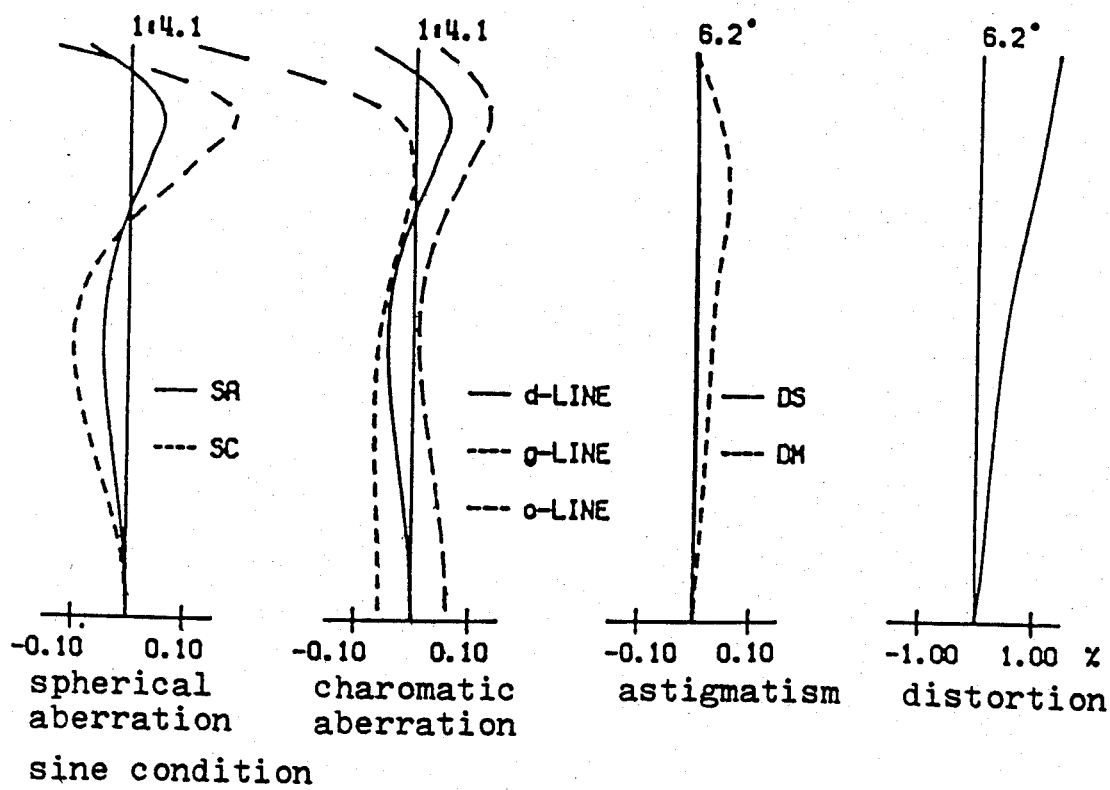

| Example 2 (FIG. 3) F = 195 FNO 1:4.1 ω = 6.2° | | | |
|---|---|---|---|
| | r | d | n | ν |
| 1 | 44.350 | | 1.49700 | 81.6 |
| | 9.626 | | |
| 2 | −653.250 | | |
| | 0.200 | | |
| 3 | 41.329 | | 1.49700 | 81.6 |
| | 7.749 | | |
| 4 | 452.680 | | |
| | 1.839 | | |
| 5 | −450.030 | | 1.83400 | 37.2 |
| | 3.190 | | |
| 6 | 39.028 | | |
| | 0.088 | | |
| 7 | 24.216 | | 1.49700 | 81.6 |
| | 7.954 | | |
| 8 | 93.331 | | |
| | 14.172 | | |
| 9 | −383.189 | | 1.80400 | 46.6 |
| | 1.700 | | |
| 10 | 13.096 | | 1.64769 | 33.8 |
| | 6.072 | | |
| 11 | −39.444 | | |
| | 2.085 | | |
| 12 | −30.570 | | 1.81554 | 44.4 |
| | 1.380 | | |
| 13 | 20.275 | | 1.59270 | 35.3 |
| | 4.788 | | |
| 14 | −21.206 | | |
| | 1.583 | | |
| 15 | −16.389 | | 1.83481 | 42.7 |
| | 1.360 | | |
| 16 | −117.094 | | |
| | 9.817 | | |
| 17 | 49.185 | | 1.48749 | 70.1 |
| | 3.579 | | |
| 18 | −487.877 | | |

$$\frac{\nu_1 + \nu_2 + \nu_4}{3} = 81.6$$

$$F_{1,2,3,4}/F = 0.31$$

$$\frac{(n_5 + n_7) - (n_6 + n_8)}{2} = 0.19$$

-continued

| Example 2 (FIG. 3) F = 195 FNO 1:4.1 ω = 6.2° | | | |
|---|---|---|---|
| $d_{16} = 0.050F$ | | | |

Figure 5:
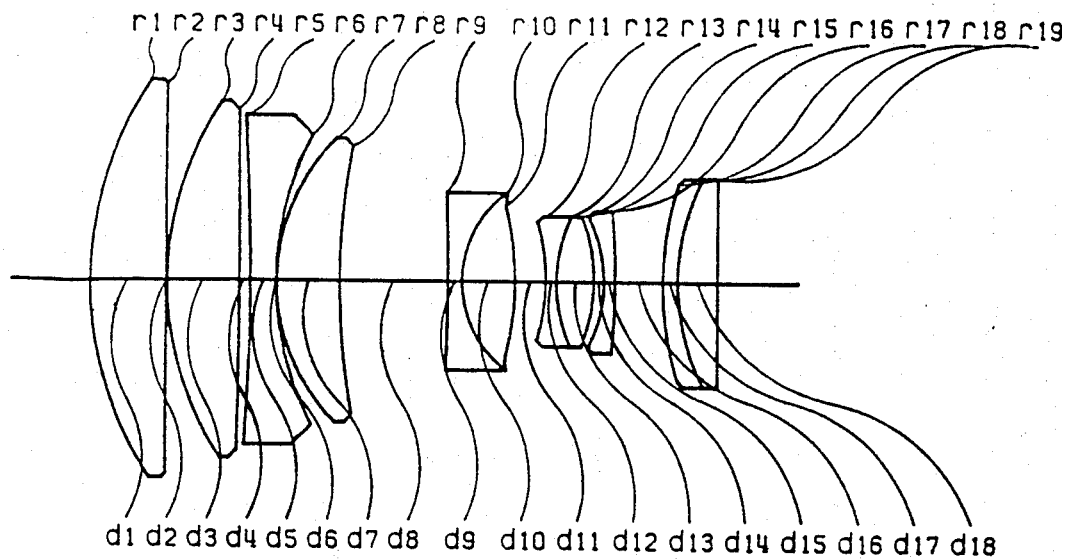
Figure 6:
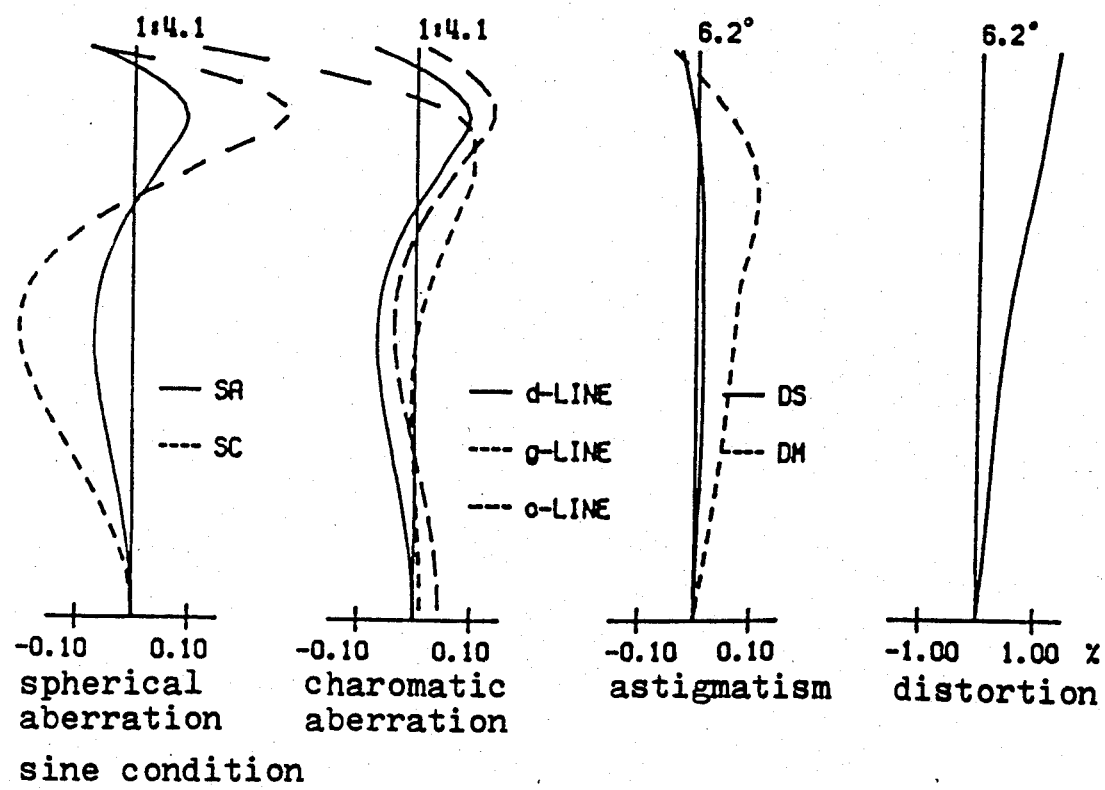

| Example 3 (FIG. 5) F = 195 FNO 1:4.1 ω = 6.2° | | | |
|---|---|---|---|
| | r | d | n | ν |
| 1 | 43.823 | | 1.49700 | 81.6 |
| | 9.340 | | |
| 2 | 34818.953 | | |
| | 0.200 | | |
| 3 | 38.918 | | 1.49700 | 81.6 |
| | 8.855 | | |
| 4 | −1468.269 | | |
| | 1.387 | | |
| 5 | −315.196 | | 1.83400 | 37.2 |
| | 3.190 | | |
| 6 | 37.034 | | |
| | 0.148 | | |
| 7 | 24.358 | | 1.49700 | 81.6 |
| | 7.716 | | |
| 8 | 86.023 | | |
| | 13.421 | | |
| 9 | −312.859 | | 1.80400 | 46.6 |
| | 1.700 | | |
| 10 | 13.332 | | 1.64769 | 33.8 |
| | 6.614 | | |
| 11 | −36.805 | | |
| | 3.790 | | |
| 12 | −26.039 | | 1.81600 | 46.6 |
| | 1.380 | | |
| 13 | 18.702 | | 1.59270 | 35.3 |
| | 4.620 | | |
| 14 | −21.934 | | |
| | 1.284 | | |
| 15 | −17.598 | | 1.83481 | 42.7 |
| | 1.360 | | |
| 16 | −92.721 | | |
| | 5.996 | | |
| 17 | 39.908 | | 1.56732 | 42.8 |
| | 1.848 | | |
| 18 | 27.319 | | 1.48749 | 70.1 |
| | 5.000 | | |
| 19 | ∞ | | |

$$\frac{\nu_1 + \nu_2 + \nu_4}{3} = 81.6$$

$$F_{1,2,3,4}/F = 0.31$$

$$\frac{(n_5 + n_7) - (n_6 + n_8)}{2} = 0.19$$

$$d_{16} = 0.031F$$

Although a preferred embodiment has been shown and described, it should be understood that many changes and modifications may be made therein without departing from the scope of the appended claim.

What is claimed is:

1. An ultracompact telephoto eight-component ten-element lens comprising, in order from an object, a front four-component four-element lens group including a first positive lens having a surface of a smaller radius of curvature directed toward the object, a second positive lens having a surface of a smaller radius of curvature directed toward the object, a third double-concave lens, and a fourth positive-meniscus lens having a surface of a smaller radius of curvature directed toward the object, an intermediate three-component five-element lens group including a compound lens composed of a fifth negative lens and a sixth double-convex lens, a compound lens composed of a seventh negative lens and an eighth double-convex lens, and a ninth negative lens having a surface of a smaller radius of curvature directed toward the object, and a rear lens component including a tenth positive lens, the telephoto lens being arranged to meet the following conditions:

$$\frac{\nu_1 + \nu_2 + \nu_4}{3} > 75 \quad (1)$$

$$0.4 > F_{1,2,3,4}/F > 0.2 \quad (2)$$

$$\frac{(n_5 + n_7) - (n_6 + n_8)}{2} > 0.1 \quad (3)$$

$$0.07\,F > d_{16} > 0.03\,F \quad (4)$$

where $\nu_i$ is the Abbe number of the ith lens, $F_{1,2,3,4}$ is the combined focal length of the first to fourth lenses, F is the combined focal length of the overall lens system, $n_i$ is the refractive index at d-line of the ith lens, and $d_{16}$ is the distance between the ninth and tenth lenses.

2. An ultracompact telephoto eight-component eleven-element lens comprising, in order from an object, a front four-component four-element lens group including a first positive lens having a surface of a smaller radius of curvature directed toward the object, a second positive lens having a surface of a smaller radius of curvature directed toward the object, a third double-concave lens, and a fourth positive-meniscus lens having a surface of a smaller radius of curvature directed toward the object, an intermediate three-component five-element lens group including a compound lens composed of a fifth negative lens and a sixth double-convex lens, a compound lens composed of a seventh negative lens and an eighth double-convex lens, and a ninth negative lens having a surface of a smaller radius of curvature directed toward the object, and a rear lens component including a positive compound lens composed of a tenth positive lens and an eleventh negative lens, the telephoto lens being arranged to meet the following conditions:

$$\frac{\nu_1 + \nu_2 + \nu_4}{3} > 75 \quad (1)$$

$$0.4 > F_{1,2,3,4}/F > 0.2 \quad (2)$$

$$\frac{(n_5 + n_7) - (n_6 + n_8)}{2} > 0.1 \quad (3)$$

$$0.07\,F > d_{16} > 0.03\,F \quad (4)$$

where $\nu_i$ is the Abbe number of the ith lens, $F_{1,2,3,4}$ is the combined focal length of the first to fourth lenses;

F is the combined focal length of the overall lens system, $n_i$ is the refractive index at d-line of the ith lens, and $d_{16}$ is the distance between the ninth and tenth lenses.

* * * * *